L. RAVEL.
CONNECTION BETWEEN REAR AXLE AND CHASSIS.
APPLICATION FILED APR. 30, 1914. RENEWED MAY 12, 1916.
1,195,267.
Patented Aug. 22, 1916.
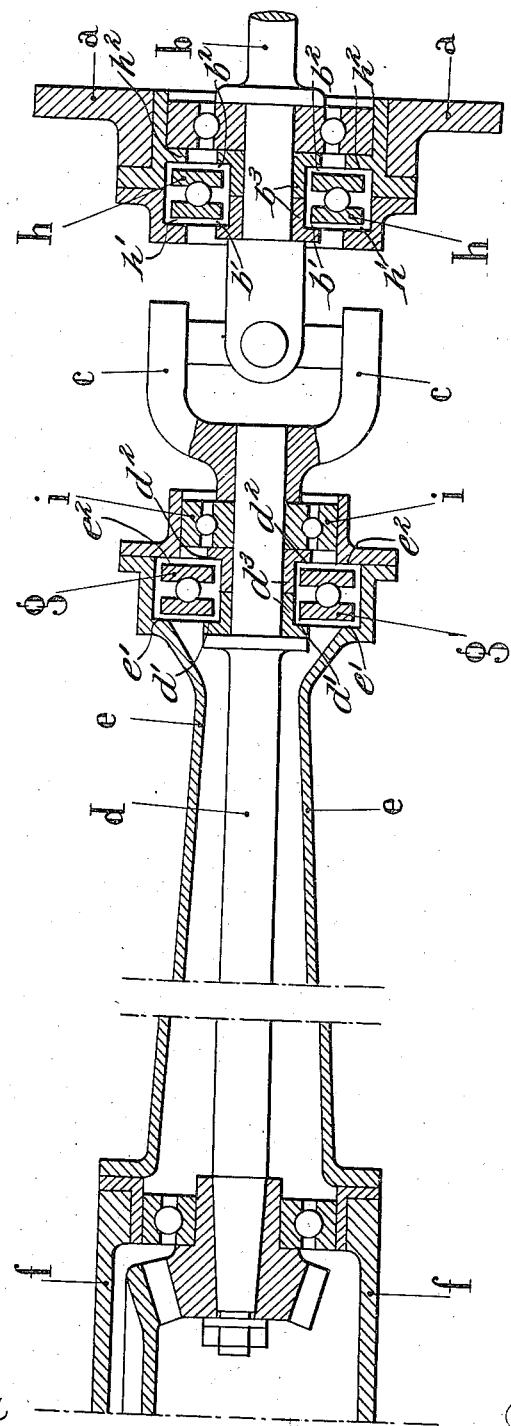

UNITED STATES PATENT OFFICE.

LOUIS RAVEL, OF BOULOGNE-SUR-SEINE, FRANCE.

CONNECTION BETWEEN REAR AXLE AND CHASSIS.

1,195,267.   Specification of Letters Patent.   Patented Aug. 22, 1916.

Application filed April 30, 1914, Serial No. 835,520. Renewed May 12, 1916. Serial No. 97,183.

*To all whom it may concern:*

Be it known that I, LOUIS RAVEL, a citizen of the French Republic, residing at Boulogne-sur-Seine, in France, have invented certain new and useful Improvements in Means for Connecting the Rear Axle to the Chassis in Motor Road-Vehicles, of which the following is a full, clear, and exact description.

In motor road vehicles in which the transmission is by Cardan shaft the rear driving axle is connected with the chassis in such a manner as to transmit to the latter the thrust of the driving wheels, while at the same time it should be displaceable relatively to the chassis in following the undulations of the ground and the flexure of the springs.

Hitherto this connection has been effected either by means of thrust rods or by jointing to the chassis by means of a fork or a ball joint the sleeve which incloses the Cardan shaft, or by utilizing the suspension springs for the propulsion of the vehicle and balancing the reaction of the driving couple.

The method of mounting hereinafter described consists in utilizing the Cardan shaft itself and the tube rigid with the rear bridge which incloses it for receiving the thrust of the driving wheels and balancing the reaction of the driving couple, while still leaving to the suspension springs freedom to fulfil their functions.

The invention is illustrated in the accompanying drawing by a longitudinal sectional view, partly in elevation, and in said drawing $a$ is a portion of the transmission gear casing or some other part fixed to the chassis and supporting the drive shaft $b$ of the transmission gearing at the extremity of which the Cardan joint $c$ is situated.

$d$ is the Cardan shaft which is arranged in a tube $e$ rigid with the rear axle bridge or housing $f$.

The drive of the driving wheels is transmitted to the housing $f$ and consequently to the tube $e$ rigid therewith: this thrust is received by a ball bearing $g$ mounted freely between two shoulders $e'$, $e^2$ provided on the tube $e$, and two shoulders $d'$, $d^2$ provided on collars $d^3$ fixed upon the shaft $d$; in this manner this bearing is housed in a cage slightly larger than itself in such a manner that it is able to bear indifferently upon one or other of the four shoulders that surround it. This arrangement renders it possible to transmit through a single bearing both the thrust and tractional strains and thereby serve the same purpose as two ordinary bearings with opposed actions.

The thrust of the Cardan shaft is transmitted by the joint $c$ to the shaft $b$ and by the latter to the gear case or the frame rigid with the chassis by the intermediary of a ball bearing $h$ mounted and acting in the same manner as the bearing $g$, that is to say, the bearing $h$, is mounted freely between two shoulders $h'$ $h^2$ provided on the casing $a$, and two shoulders $b'$ $b^2$ provided on collars $b^3$ fixed on the shaft $b$.

The reaction of the axle which would tend to cause it to rotate in the opposite direction to the driving wheels is balanced by the Cardan shaft $d$ and the tube $e$ rigid with the bridge, the forward end of which tube $e$ is provided with a plain or ball bearing $i$. This method of mounting the rear bridge amounts to jointing to the chassis at a single fixed point which is the center of the Cardan joint. The bridge is thus free to oscillate in all directions around this point as the suspension springs mounted upon double shackles are in no way impeded in their functions. This arrangement presents the further advantage of eliminating the thrust rods and the sliding of the Cardan shaft.

It will be obvious that each of the two double-acting bearings might be replaced by two single-acting bearings, so that there would be four bearings in all, but the arrangement described presents the advantage of simplicity.

I claim:

In a motor vehicle, the combination with a rear axle housing, a propeller shaft, a transmission drive shaft, and a universal joint intermediate said shafts, of a housing inclosing the propeller shaft and fixedly secured to the rear axle housing, a thrust bearing arranged at the forward end of the said propeller shaft housing and receiving the thrusts of the latter, and a thrust bearing arranged to receive the thrusts imparted thereto from the propeller shaft through the universal joint, and transmit same to the transmission gear case.

In testimony whereof I affix my signature in presence of two witnesses.

LOUIS RAVEL.

Witnesses:
JULIAN KATRAY,
MAURICE PICARD.